Nov. 7, 1967

E. D. DAVENPORT 3,350,806

SCROLL TYPE REFERENCE GUIDE

Filed Aug. 30, 1965

INVENTOR

Edward D. Davenport

BY Cecil L. Wood

ATTORNEY 3,350,806

SCROLL TYPE REFERENCE GUIDE

Edward D. Davenport, 3471 Golfing Green Drive, Dallas, Tex. 75234

Filed Aug. 30, 1965, Ser. No. 483,405
3 Claims. (Cl. 40—336)

ABSTRACT OF THE DISCLOSURE

The invention, in general, comprises a prerolled resilient strip of relatively thin plastic material capable of attachment to the base of a telephone instrument and bearing such information as listed telephone numbers, and other reference indicia, for convenient access to persons using the telephone, and providing a retractable scroll which can be readily and easily extended, as desired, to expose the information imprinted thereon and, when released, will recoil to its retracted position.

This invention relates to self-retracting indexing or reference guides, such as the listing of telephone numbers, or other reference data, and it has particular reference to a scroll type device having special adaptation to attachment to a telephone instrument.

A variety of devices have been designed for listing names, addresses, telephone numbers, and other information for ready reference, and embodied in indexed pads generally used as desk accessories, and have been embodied into devices involving the use of sliding panels and attached to the bases of telephone instruments, but such devices are often undesirable due to their interference with the proper use of the telephone or to their inability to be satisfactorily attached to the instrument.

The primary object of the instant invention resides in the provision of a simple and inexpensive scroll formed of relatively thin sheeting, preferably a plastic material, having substantial resilience whereby, when scrolled, is inherently retractible into a roll when extended and released, and is adapted for detachable securement to the base of the telephone instrument, or other suitable surface, for ready accessibility.

Another object of the invention is that of providing a device of the character described to which may be applied a series of adhesive strips on which the listed information can be imprinted and arranged in any desired sequences, such as numerically or alphabetically, and be capable of removal or replacement as required, or such data may be applied in any other suitable manner.

Broadly, the invention contemplates the provision of a compact and economical device by which any information, such as telephone numbers, and similar information, can be made readily available at all times.

While the foregoing objects are paramount, other and lesser objects will become apparent as the description proceeds when considered in connection with the appended drawings wherein.

Figure 5:
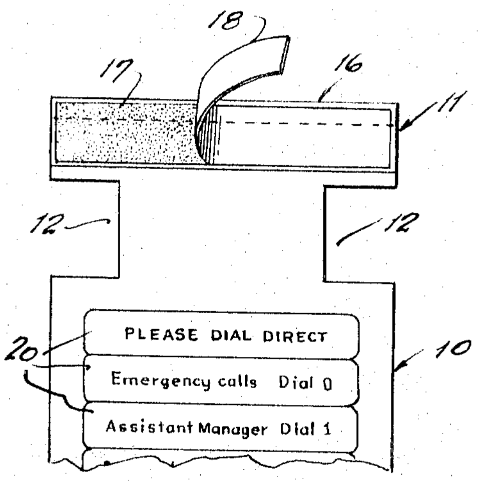
Figure 6:
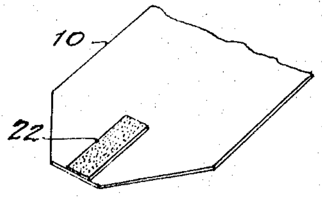

FIGURE 5 is a fragmentary plan view of the resilient strip embodying the invention showing the cutout portions in the opposing edges to accommodate the leg elements of the telephone instrument, and illustrating the adhesive strip and its removable protecting cover, and FIGURE 6 is a fragmentary perspective illustration of a modification of the attaching end of the invention and the adhesive tab thereon.

The invention comprises, in its preferred form, a resilient strip 10 which is formed of a material which, when reduced to a roll of relatively small diameter, tends to retain its form so that when unrolled or extended and released the strip 10 will retract to its original form. The strip 10, at its secured end 11, and spaced inwardly from its extremity on opposite edges, has notches 12 which may assume a rectangular form, as shown in FIGURES 2 and 5, or semicircular, as desired, whereby to surround or embrace the foot or leg members 13 at each front corner of the base 14 of a telephone instrument 15, in the manner shown in FIGURES 2 and 3.

Figure 1:
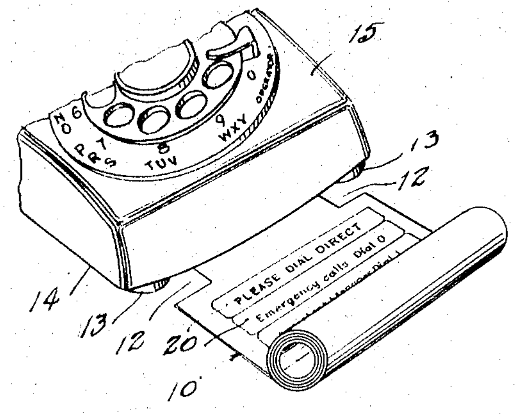
FIGURE 1 is a fragmentary perspective view of a telephone instrument showing the invention attached thereto and partially unrolled.
Figure 2:
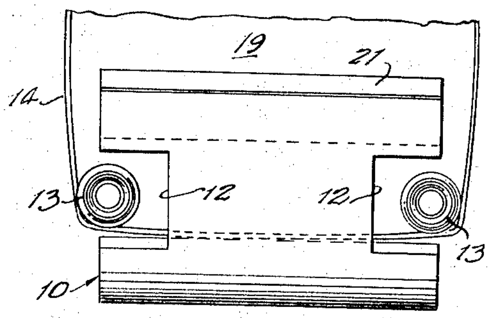
FIGURE 2 is a fragmentary inverted plan view of a telephone instrument showing the invention applied thereto in retracted position.

The formation of the notches 12 near the inner end of the strip 10 defines a T-shaped portion 16, as shown especially in FIGURES 2 and 5. A strip 17 of an adhesive is applied to the portion 16 having a removable protective cover strip 18, the adhesive being capable of application to the undersurface 19 of the base 14 of the instrument 15 in the manner illustrated in FIGURES 2 and 3 so that, when retracted to its original or normal rolled form it will assume the position illustrated in solid lines in FIGURES 2 and 3, and when extended or unrolled to expose the indicia 20 thereon, shown in FIGURES 1 and 5, the strip 10 will assume positions such as indicated in solid lines in FIGURE 1 or the broken lines shown in FIGURE 3. The indicia 20 may be printed directly upon the strip 10 or printed on adhesive strips which may be applied thereto.

Figures 3, 4:
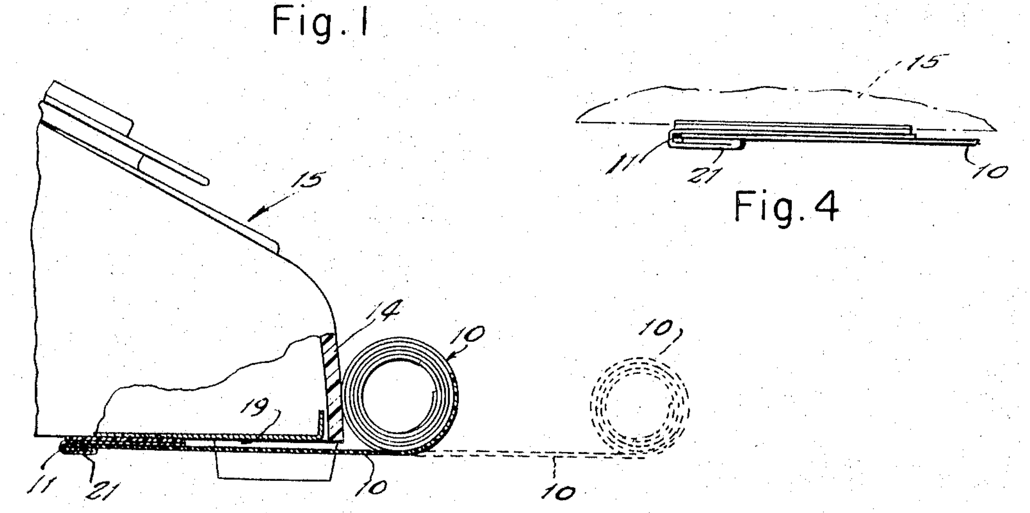
FIGURE 3 is a fragmentary side view, partially in section, showing the invention attached thereto, and illustrating in broken lines, the invention partially extended.
FIGURE 4 is an edge view of the secured end of the resilient scroll, in fragmentary elevation, showing the adhesive strip, with its removable protective cover, a telephone instrument being fragmentarily shown in broken lines.

To provide suitable rigidity for the extreme inner end of the strip 10 a reinforcing element 21 is applied thereto and is folded over the end of the strip 10 and turned inwardly upon itself, as shown in FIGURES 3 and 4. This feature of the invention is optional.

The form and arrangement of the invention is such that its normal inoperative position will be adjacent to the front of the base 14 of the telephone instrument 15 at all times and capable of being unrolled and held against its normal inherency to recoil, while viewing the reference data thereon.

A modification of the attaching end of the strip 10 is shown fragmentarily in FIGURE 6 in which the opposing sides are tapered inwardly, an adhesive strip 22 being applied to the tip of the strip 10 by which it is attached to the instrument 15.

Obviously, the invention may be formed in a variety of shapes and applied to other uses than that described without departing from the spirit thereof, and it is intended that the invention be limited only by the scope of the appended claims.

What is claimed is:

1. In an indexed guide for listing reference data, a resilient strip formed of relatively thin material and having the inherent characteristic of retaining itself in a roll and self-retractible when extended from its rolled position, the said strip having adhesive means on its free end for attachment to a telephone instrument, and having indicia applied to its inner surface exposable when said strip is unrolled against its inherent tension.

2. A new article of manufacture, a telephone reference guide comprising a relatively thin strip of resilient material formed in a roll and having the inherent characteristic of self-retraction when unrolled, adhesive means on one end of said strip for securement to a telephone instrument, and indicia imprinted on the inner surface of said strip exposable as said strip is unrolled.

3. A new article of manufacture, a reference guide comprising a flexible strip having indicia thereon, the said strip being formed of a relatively thin resilient material having the characteristic, when rolled, to maintain its rolled form and is inherently self-retractible, and adhesive means on one end of said strip for securing the same to a telephone instrument.

References Cited

UNITED STATES PATENTS

| | | | |
|---|---|---|---|
| 2,414,597 | 1/1947 | Higbee | 40—336 |
| 2,852,143 | 9/1958 | Tabor | 211—49 |
| 3,014,294 | 12/1961 | Singer | 40—5 |
| 3,169,341 | 2/1965 | White | 281—15 |

FOREIGN PATENTS

| | | |
|---|---|---|
| 217,356 | 6/1942 | Switzerland. |

EUGENE R. CAPOZIO, *Primary Examiner.*

W. GRIEB, *Assistant Examiner.*